United States Patent
Kim et al.

(10) Patent No.: US 6,888,553 B2
(45) Date of Patent: May 3, 2005

(54) APPARATUS AND METHOD FOR ADJUSTING COLOR TEMPERATURE OF DISPLAYED IMAGE USING COLOR TEMPERATURE METADATA

(75) Inventors: Sang-kyun Kim, Kyungki-do (KR); Du-sik Park, Kyungki-do (KR); Chang-yeong Kim, Kyungki-do (KR); Ki-won Yoo, Seoul (KR); Young-sik Huh, Kyungki-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 58 days.

(21) Appl. No.: 10/434,286

(22) Filed: May 9, 2003

(65) Prior Publication Data

US 2004/0006554 A1 Jan. 8, 2004

Related U.S. Application Data

(63) Continuation-in-part of application No. 10/341,510, filed on Jan. 14, 2003.

(30) Foreign Application Priority Data

May 10, 2002 (KR) .......................................... 2002-25910
May 7, 2003 (KR) .......................................... 2003-28873

(51) Int. Cl.[7] .............................................. G09G 5/02
(52) U.S. Cl. ...................... 345/589; 358/518; 358/521; 707/10; 707/102; 345/600
(58) Field of Search ................................ 345/589, 600; 382/167; 358/1.9, 518, 521; 348/223.1

(56) References Cited

U.S. PATENT DOCUMENTS

| | | | | |
|---|---|---|---|---|
| 5,541,649 A | * | 7/1996 | Yamamoto et al. | 348/223.1 |
| 5,874,955 A | * | 2/1999 | Rogowitz et al. | 345/589 |
| 6,160,579 A | * | 12/2000 | Shiraiwa et al. | 348/224.1 |
| 6,629,104 B1 | * | 9/2003 | Parulski et al. | 707/102 |
| 6,757,684 B1 | * | 6/2004 | Svendsen et al. | 707/10 |
| 2001/0030694 A1 | * | 10/2001 | Abe | 348/223 |
| 2001/0040588 A1 | * | 11/2001 | Shiraiwa et al. | 345/690 |

FOREIGN PATENT DOCUMENTS

| | | | | |
|---|---|---|---|---|
| EP | 0 574 993 A1 | * | 11/1993 | ......... H05B/41/392 |
| JP | A-10-340336 | | 12/1998 | |
| JP | 10-340336 A | | 12/1998 | |
| KR | 1998-78328 | * | 11/1998 | ............ H03N/9/64 |
| KR | 1998-79137 | * | 11/1998 | ............ H03N/9/64 |
| KR | 10-0230446 B1 | | 8/1999 | |
| KR | 10-0237284 B1 | | 10/1999 | |
| KR | 2002-0079348 A | | 10/2002 | |

OTHER PUBLICATIONS

NISO Standards Committee, "NISO Draft Standard, Data Dictionary—Technical Metadata for Digital Still Images," Working Draft 1.0, Jul. 5, 2000.*

(Continued)

Primary Examiner—Matthew C. Bella
Assistant Examiner—Alysa N Brautigam
(74) Attorney, Agent, or Firm—Burns, Doane, Swecker & Mathis, L.L.P.

(57) ABSTRACT

There are provided an apparatus and a method for adjusting the color temperature of an input image using metadata corresponding to the color temperature of the input image. The apparatus includes a color temperature calculation unit which receives a predetermined image and calculates the color temperature of the predetermined image, a metadata generation unit which divides a color temperature range into a plurality of color temperature sections and generates metadata using information on a color temperature section to which the color temperature of the predetermined image belongs, and a metadata database which stores the metadata corresponding to the predetermined image and transmits the metadata to a user terminal.

33 Claims, 4 Drawing Sheets

OTHER PUBLICATIONS

"Working with raw image files in Adobe Photoshop," http://www.adobe.com/products/photoshop/pdfs/ps_cameraraw_userguide.pdf.*

"Adobe Photoshop for Windows—Downloads", http://www.adobe.com/support/downloads/product.jsp?product=39&platform=Windows.*

Digital Imaging Group, Inc., "DIG35 Specification—Metadata for Digital Images," Version 1.0, Aug. 30, 2000, pp 26–43.*

"Digging into Adobe Camera Raw—Tutorial," http://studio.adobe.com/us/tips/tip.jsp?p=1&id=650&xml=phs8ppraw.*

* cited by examiner

APPARATUS AND METHOD FOR ADJUSTING COLOR TEMPERATURE OF DISPLAYED IMAGE USING COLOR TEMPERATURE METADATA

BACKGROUND OF THE INVENTION

This application is a continuation-in-part of U.S. patent application Ser. No. 10/341,510, filed on Jan. 14, 2003 and claims the priority of Korean Patent Application Nos. 2002-25910 and 2003-28873, filed on May 10, 2002 and May 7, 2003, respectively, in the Korean Intellectual Property Office, the disclosures of which are incorporated herein in their entireties by reference.

1. Field of the Invention

The present invention relates to a method and an apparatus for adjusting the color temperature of an output image to be displayed according to a user's preference, and more particularly, to a method and an apparatus for adjusting display preference using color temperature metadata.

2. Description of the Related Art

In conventional techniques, the color temperature of an output image provided to a user has been adjusted by calculating the color temperature of the corresponding image in a user image terminal.

However, according to such conventional techniques, it is difficult to reduce the cost of manufacturing user terminals since such user terminals must be manufactured to be able to compute the color temperatures of an image. In addition, it is difficult to store the color temperatures of an image, which are already computed, in a database as metadata and to re-use the metadata.

SUMMARY OF THE INVENTION

The present invention provides an apparatus and a method for adjusting the color temperature of an input image using metadata corresponding to the color temperature of the input image.

According to an aspect of the present invention, there is provided an apparatus for providing image metadata. The apparatus includes a color temperature calculation unit which receives a predetermined image and calculates the color temperature of the predetermined image, a metadata generation unit which divides a color temperature range into a plurality of color temperature sections and generates metadata using information on a color temperature section to which the color temperature of the predetermined image belongs, and a metadata database which stores the metadata corresponding to the predetermined image and transmits the metadata to a user terminal.

Preferably, the metadata generation unit divides the color temperature range into a first predetermined number of color temperature sections, converts each of the first predetermined number of color temperature sections into a reciprocal color temperature section, divides the reciprocal color temperature section into a second predetermined number of reciprocal color temperature sub-sections, and determines a color temperature section to which the color temperature of the predetermined image belongs.

According to another aspect of the present invention, there is provided an apparatus for adjusting the color temperature of an image. The apparatus includes a metadata decoding unit which receives metadata containing information on the color temperature of the image, identifies a color temperature section to which the color temperature of the image belongs, converts the color temperature section into a reciprocal color temperature section, identifies a reciprocal color temperature sub-section to which the color temperature of the image belongs, and then determines a color temperature of an image to be output, a color temperature conversion unit which receives the image and adjusts the color temperature of the image based upon the determined color temperature and a preferred color temperature input from a user, and an output unit which outputs the image having the adjusted color temperature to the user.

According to another aspect of the present invention, there is provided a method for providing image metadata. The method includes (a) calculating the color temperature of a predetermined input image, (b) dividing a color temperature range into a plurality of color temperature sections and generating metadata using information on a color temperature section to which the color temperature of the input image belongs, and (c) storing the metadata and transmitting the input image and its corresponding metadata to a user terminal.

Preferably, in step (b), the color temperature range is divided into a first predetermined number of color temperature sections, each of the first predetermined number of color temperature sections is converted into a reciprocal color temperature section, the reciprocal color temperature section is divided into a second predetermined number of reciprocal color temperature sub-sections, and a color temperature section to which the color temperature of the predetermined image belongs is determined.

According to another aspect of the present invention, there is provided a method for adjusting the color temperature of an image. The method includes (a) receiving metadata containing information on the color temperature of the image and identifying a color temperature section to which the color temperature of the image belongs, (b) converting the color temperature section into a reciprocal color temperature section, identifying a reciprocal color temperature sub-section to which the color temperature of the image belongs, and then determining a color temperature of an image to be output, (c) receiving the image and adjusting the color temperature of the image based upon the determined color temperature and a preferred color temperature input from a user, and (d) outputting the image having the adjusted color temperature to the user.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention relates to an apparatus and a method for adjusting display preference. Supposing that a moving image is provided by an image database 130 as an input image, the method involves (a) calculating the color temperature of the input image, storing the calculated temperature in the form of metadata using a descriptor appropriate for the input image, and transmitting the input image and the metadata through a transmission medium, (b) decoding the transmitted metadata and calculating the color temperature of the input image using the decoded metadata, (c) receiving color temperature preferred by a user and converting the input image based upon the calculated color temperature of the input image and the color temperature preferred by the user so that the input image can be displayed having the color temperature preferred by the user, and (d) displaying the converted image. In addition, the present invention also relates to the structure of the metadata.

According to the present invention, it is possible for a contents provider to perform a process of calculating color temperature, which conventionally requires a considerable amount of computations, during preparing contents, and to transmit a small amount of metadata with contents (image data). In addition, a contents client does not need to additionally calculate color temperature, thus reducing the cost of manufacturing a display device for the contents client. Accordingly, a user can modify an image to have a preferred color temperature using a portable terminal, even though the portable terminal is generally less effective than a TV set or a personal computer in terms of computability.

Moreover, according to the present invention, it is possible to re-use color temperatures of an image, which have already been obtained through computations, by storing them in a database for metadata. Therefore, the present invention is capable of providing a more effective system for providing images, as compared to the prior art in which the color temperature of an image is calculated using a contents client image terminal and then the color temperature of the image is adjusted according to a user's preference.

Figure 1:
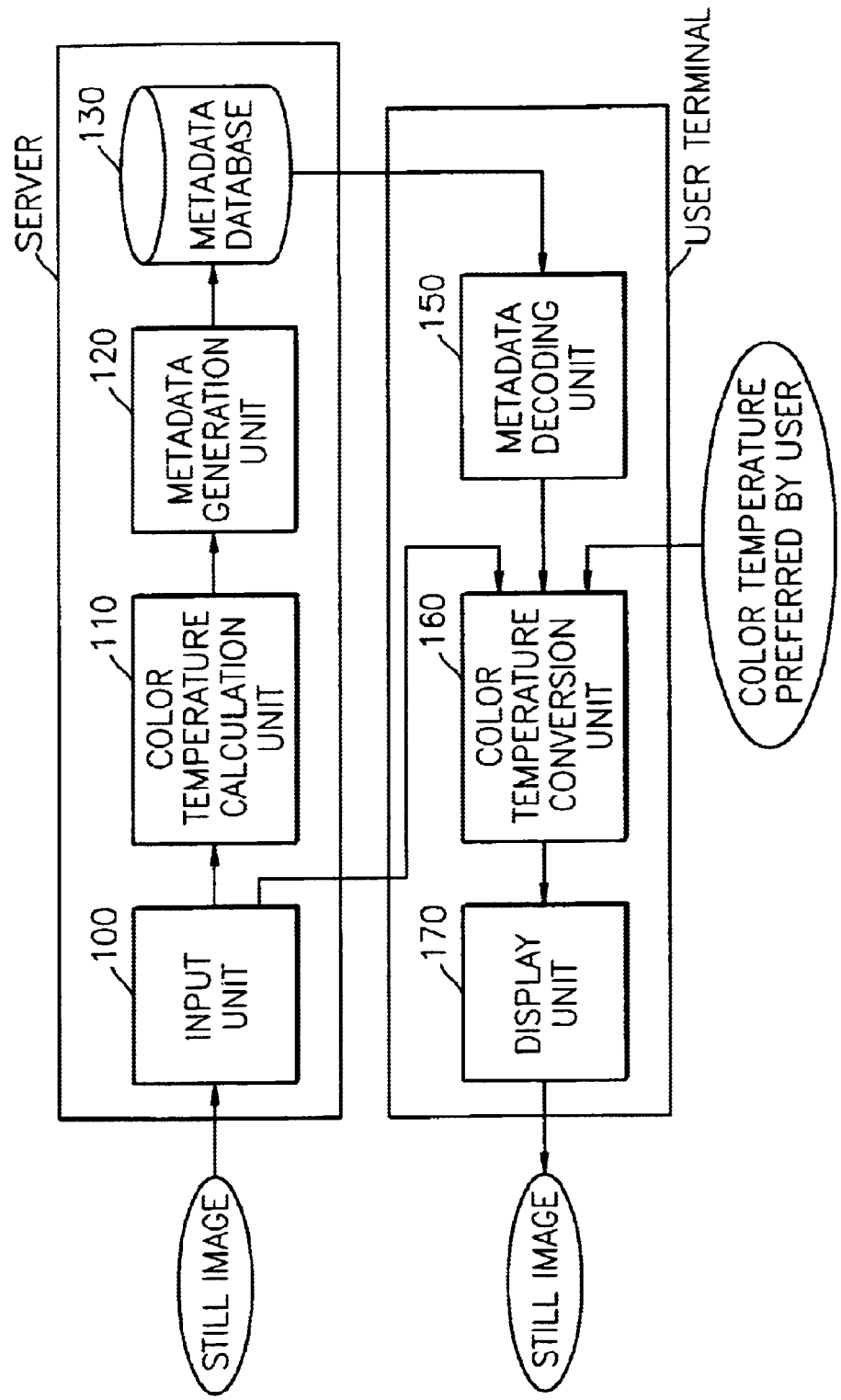
FIG. 1 is a block diagram of an apparatus for adjusting the color temperature of a displayed image using color temperature metadata according to a preferred embodiment of the present invention.
Figure 2:
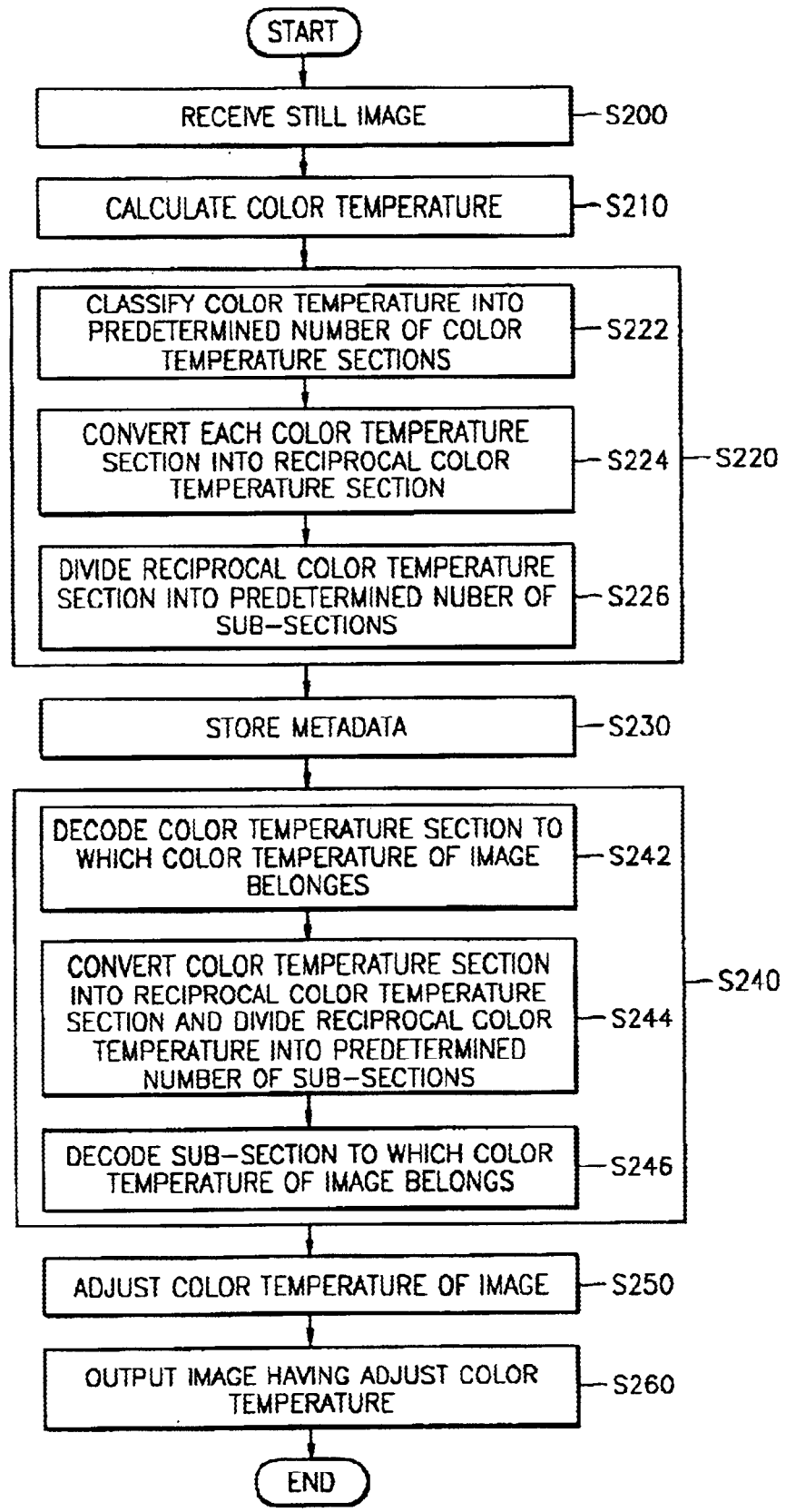
FIG. 2 is a flowchart of a method for adjusting the color temperature of a displayed image using color temperature metadata according to a preferred embodiment of the present invention.

Hereinafter, the present invention will now be described more fully with reference to the accompanying drawings in which preferred embodiments of the invention are shown. FIG. 1 is a block diagram of an apparatus for adjusting the color temperature of a displayed image using color temperature metadata according to a first embodiment of the present invention, and FIG. 2 is a method for adjusting the color temperature of a displayed image using color temperature metadata according to a first embodiment of the present invention.

The apparatus for adjusting the color temperature of a displayed image using color temperature metadata according to the first embodiment of the present invention includes a server which provides still image content and a user terminal which displays the provided still image content. The server includes an input unit 100 through which an image is input, a color temperature calculation unit 110 which calculates the color temperature of the input image, a metadata generation unit 120 which generates metadata indicating the calculated color temperature, and a metadata database 130 which stores the generated metadata. The user terminal includes a metadata decoding unit 150 which receives metadata from the metadata database 130 and decodes the received metadata, a color temperature conversion unit 160 which converts an image to be displayed according to the decoded metadata and a color temperature preferred by a user, and a display unit 170 which displays the converted image.

The method for adjusting the color temperature of a displayed image using color temperature metadata according to the first embodiment of the present invention will be described in the following paragraphs with reference to FIG. 2.

A still image to be displayed at the user terminal is input into the input unit 100 of the server and then output to the color temperature calculation unit 110 in step S200.

In step S210, the color temperature calculator 110 calculates the color temperature of the image input from the input unit 100 by converting the input image into a CIE XYZ color space, approximating the chromaticity coordinates (x,y) of a light source, converting the chromaticity coordinates (x,y) into a correlated color temperature which will act as a descriptor representing an image. The method of deriving the chromaticity coordinates is disclosed in Japanese Application No. 10-118862, and Korean Patent Nos. 237284 and 230446.

The metadata generation unit 120 generates metadata using the color temperature of the image input from the color temperature calculation unit 110 in step S220. Here, the metadata represents the color temperature of an image. In the present invention, metadata is generated using the color temperature of each image. However, the metadata may be generated using a commentary about what a user feels about an image. One of the simplest methods for generating metadata using color temperature is representing a color temperature between 1,667 K and 25,000 K by 15 bits. Another method of generating metadata using color temperature, which is adopted in the present invention, is as follows.

By using color temperatures, images can be classified based upon what a viewer feels about them temperature-wise. More specifically, the images can be classified as hot images, warm images, moderate images, or cool images by mapping the degree to which each of the images looks warm at color temperatures in a certain section.

For example, hot images can be mapped at color temperatures below 2,250 K, warm images can be mapped at color temperatures between 2,251 K and 4,170 K, moderate images can be mapped at color temperatures between 4,171 K and 8,060 K, and cool images can be mapped at color temperatures over 8,060 K. Each of the four image groups can be represented by 2 bits as metadata. For example, hot images, warm images, moderate images, and cool images can be represented by 00, 01, 10, and 11, respectively. The above-described classification of input images is shown in the following table.

TABLE 1

| Classification | Meaning | Color temperature section |
| --- | --- | --- |
| 00 | Hot | 1,667 K–2,250 K |
| 01 | Warm | 2,251 K–4,170 K |
| 10 | Moderate | 4,171 K–8,060 K |
| 11 | Cool | 8,061 K–25,000 K |

As described above, the metadata generation unit 120 classifies color temperatures input from the color temperature calculation unit 110 into a predetermined number of color temperature sections in step S222. Thereafter, the metadata generation unit 120 converts each of the color temperature sections into a reciprocal color temperature section in step S224 and then performs quantization on the reciprocal color temperature section in step S226 so that the reciprocal color temperature section can be divided into reciprocal color temperature sub-sections having the same width. Reciprocal color temperature (RC) can be calculated using color temperature (C), which is shown in the following equation.

$$RC = \frac{10^6}{C} \quad (1)$$

The reason such a reciprocal color temperature scale is used here is that the difference between the reciprocal color temperatures of images is the same as the difference between the color temperatures of the images sensed by human eyes while the difference between the color temperatures of the images fails to represent the difference between the color temperatures of the images sensed by human eyes.

After converting M color temperature sections into reciprocal color temperature sections, each of the reciprocal color temperature sections is divided by N so that a color temperature section to which the color temperature of the input image belongs can be represented by Upper(In(N)) bits. Here, Upper(X) indicates a minimum natural number greater than X. For example, Upper(2.1)=3. In a case where each of the M color temperature sections is converted into a reciprocal color temperature section and then the reciprocal color temperature section is divided by N, the color temperature section to which the color temperature of the input image belongs can be represented by Upper(In(M))+Upper(In(N)) bits. For example, in a case where there are four color temperature sections and each of the four color temperature sections has 64 reciprocal color temperature sub-sections, i.e., in a case where M=4 and N=64, the color temperature section to which the color temperature of the input image belongs can be represented by 8 bits because Upper(In(4))+Upper(In(64))=2+6=8.

The color temperature of the input image generated in the metadata generation unit 120 is stored in the metadata database 130 in step S230. A user can receive color temperature metadata corresponding to the input image from the metadata database 130. The metadata database 130 may include still images or a bunch of images constituting a moving image, i.e., representative images of the moving image. As described above, metadata generated for each input image is stored in the metadata database 130. Then, when a request for a predetermined input image is issued by the user terminal, metadata corresponding to the predetermined input image is output to the user terminal.

The metadata input into the user terminal from the metadata database 130 is decoded in the metadata decoding unit 150 of the user terminal in step S240. The metadata decoding unit 150 calculates the color temperature of an input image by decoding the transmitted metadata. The type of metadata directly affects a method of decoding the metadata. If metadata represents the color temperature (1,667 K–25,000 K) of an input image by, for example, a binary number comprised of 15 bits, only a process of converting the binary number into a decimal number is required.

However, if color temperature metadata is generated by converting the color temperature of the input image calculated by the color temperature calculation unit 110 into reciprocal color temperature then quantizing the reciprocal color temperature using the metadata generation unit 120, the metadata decoding unit 150 converts the color temperature metadata into a predetermined color temperature section and calculates a representative color temperature representing the predetermined color temperature section. For example, the average of each color temperature section can be set as a representative color temperature of each color temperature section.

Hereinafter, a method of converting a 8-bit binary number (for example, 00000001) representing metadata into a predetermined color temperature section and extracting a representative color temperature from the predetermined color temperature section will be described.

The metadata decoding unit 150 decodes the first 2 bits of 8-bit long metadata input thereinto in order to figure out which color temperature section the color temperature of an image corresponding to the input metadata belongs to in step S242. For example, the first two bits are 00, the image to be displayed is classified as a hot image having a color temperature between 1,667 K and 2,250 K. Thus, the image has a minimum color temperature $T_{lb}$ of 1,667 K and a maximum color temperature $T_{ub}$ of 2,250 K.

Thereafter, the metadata decoding unit 150 converts the maximum and minimum color temperatures $T_{ub}$ and $T_{lb}$ of the image into a reciprocal megakelvin scale using Equation (2) below.

$$RT_{lb} = \frac{10^6}{T_{lb}} \quad (2)$$

$$RT_{ub} = \frac{10^6}{T_{ub}}$$

Therefore, in the case of the image having a color temperature between 1,667

$$K \text{ and } 2{,}250 \text{ K}, RT_{lb} = \frac{10^6}{1667} = 599.88, \text{ and } RT_{ub} = \frac{10^6}{2250} = 444.444.$$

Thereafter, the metadata decoding unit 150 equally quantizes a reciprocal megakelvin scale color temperature section [599.88, 444.444] into 64 reciprocal color temperature sub-sections in step S244.

In step S246, the metadata decoding unit 150 searches for a reciprocal color temperature sub-section to which the color temperature of the image to be displayed belongs by decoding the remaining 6 bits of the metadata input from the metadata database 130. If the decoded six bits are 000001, the metadata decoding unit 150 determines that the color temperature of the image to be displayed belongs to a second reciprocal color temperature sub-section and calculates a reciprocal color temperature section corresponding to the second reciprocal color temperature sub-section, i.e., [−597.0149, 595.0227]. Thereafter, the metadata decoding unit 150 calculates an average of the reciprocal color temperature section $$\left(\frac{597.0149 + 595.0227}{2} = 596.0188\right),$$

determines the average as a representative reciprocal color temperature for the corresponding reciprocal color temperature sub-section, and determines the temperature of the image to be displayed by converting the representative reciprocal color temperature into a color temperature corresponding to the 8-bit long metadata. In other words, $$\frac{10^6}{596.0188} = 1678 \text{ K}.$$

Alternatively, a table of color temperatures corresponding to metadata may be formed in advance, and then the metadata decoding unit 150 may be constituted so that a color temperature corresponding to input 8-bit metadata can be searched for in the table by using the input 8-bit metadata as an address in a look-up table manner. In this case, even though a space where such table data needs to be stored is necessary, it is possible to quickly extract a representative color temperature without the need of hardware for computations.

In step S250, the color temperature conversion unit 160 receives an original image transmitted from the input unit 100 of the server, the decoded color temperature of the input image to be displayed, which has been transmitted from the metadata decoding unit 150, and a color temperature preferred by a user, calculates a target color temperature, and modifies the input image using the target color temperature and the color temperature preferred by the user.

One of the methods for calculating a target color temperature using the color temperature of an original image and a color temperature preferred by a user is adaptively calculating a target color temperature according to the color temperature of the original image. If the preferred color temperature is higher than the color temperature of the original image, i.e., if the user prefers a cooler image, the target color temperature is set to be higher than the color temperature of the original image in consideration of the preferred color temperature. However, in a case where the color temperature of the original image belongs to a hot image section or a warm image section, the target temperature can be set to slightly top or be the same as the color temperature of the original image. On the other hand, if the preferred color temperature is lower than the color temperature of the original image (i.e., if the user prefers a warmer image) and the color temperature of the original image belongs to a hot image section or a warm image section, the target color temperature is set to be lower than the color temperature of the original image in consideration of the preferred color temperature. If the preferred color temperature is lower than the color temperature of the original image and the color temperature of the original image belongs to a moderate image section or a cool image section, the target color temperature is set to be slightly lower than or be the same as the color temperature of the original image. This method for adjusting the color temperature of an image according to a target color temperature has been disclosed in Korean Patent Application No. 2001-73288, and thus its detailed description will not be presented here.

The image display unit 170 outputs an image whose color temperature has been adjusted to the user in step S260.

So far, the method and the apparatus for adjusting the color temperature of a still image using color temperature metadata and in consideration of a user's preference according to the first embodiment of the present invention have been described above. Hereinafter, a method and an apparatus for adjusting the color temperature of a moving image using color temperature metadata according to a second embodiment of the present invention will be described more fully with reference to FIGS. 3 and 4.

There are not so many differences between the first embodiment and the second embodiment of the present invention. One of the differences therebetween is that in the second embodiment of the present invention, moving images rather than still images are subjected to color temperature conversion. What is noteworthy about the second embodiment of the present invention is that color temperature metadata is generated for each scene of a moving image not for each frame image of the moving image. Therefore, in the following paragraphs, only the differences between the first and second embodiments of the present invention will be described.

Figure 3:
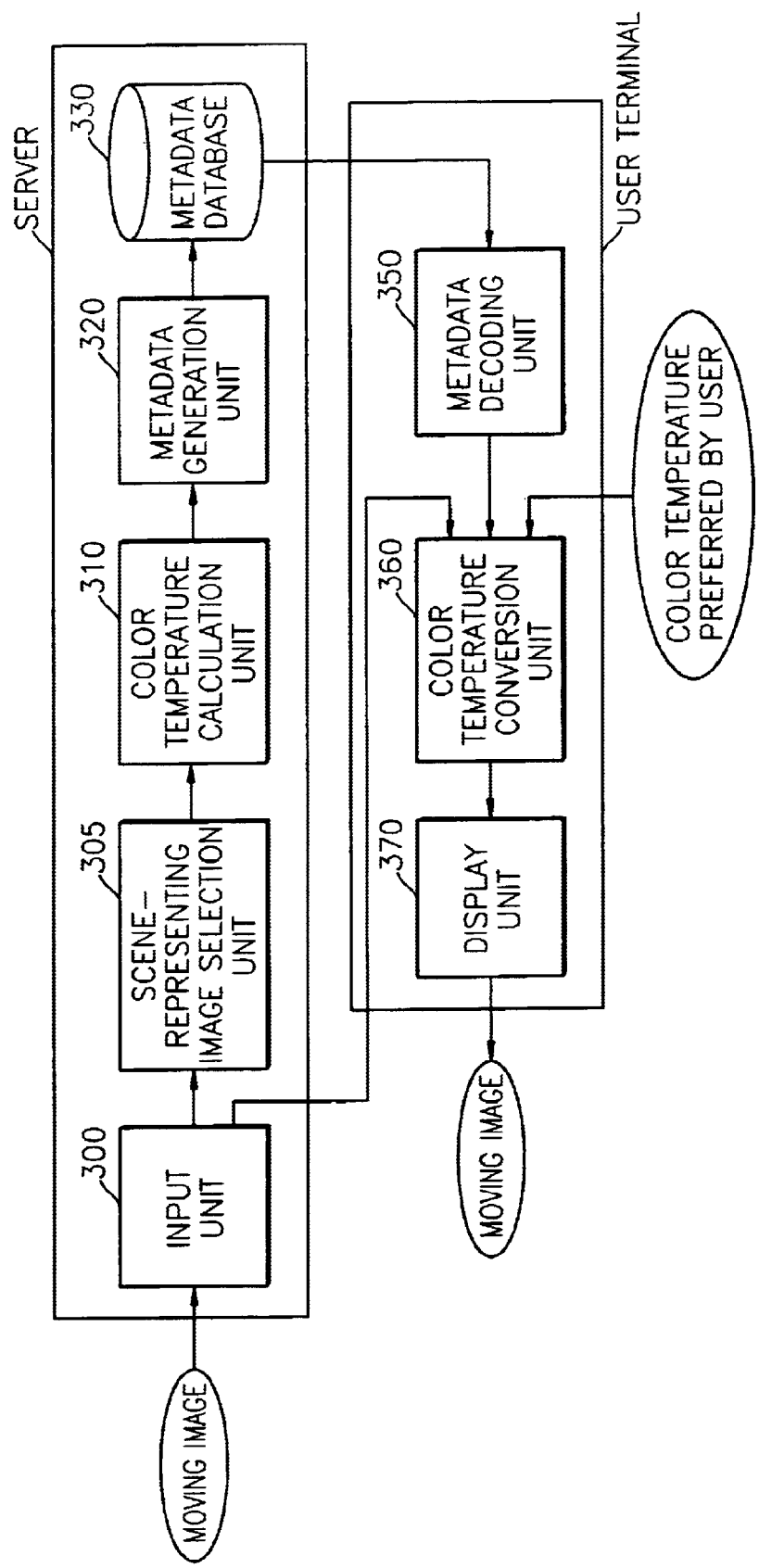
FIG. 3 is a block diagram of an apparatus for adjusting the color temperature of a moving image using color temperature metadata according to another preferred embodiment of the present invention.

FIG. 3 is a block diagram of an apparatus for adjusting the color temperature of a displayed image using color temperature metadata. The apparatus for adjusting the color temperature of a displayed image using color temperature metadata in the second embodiment of the present invention, like the one in the first embodiment of the present invention, includes a server which provides moving image content and a user terminal which displays the moving image content provided by the server. The server includes an input unit 300 through which a moving image is input, a scene-representing image selection unit 305 which divides the input moving image into scenes and selects a representative frame image representing each of the scenes, a color temperature calculation unit 310 which calculates the color temperature of each representative frame image, a metadata generation unit 320 which generates metadata indicating the calculated color temperature, and a metadata database 330 which stores the generated metadata. The user terminal performs the same functions as its counterpart in the first embodiment of the present invention except that it displays the moving image provided by the input unit 300 of the server.

Figure 4:
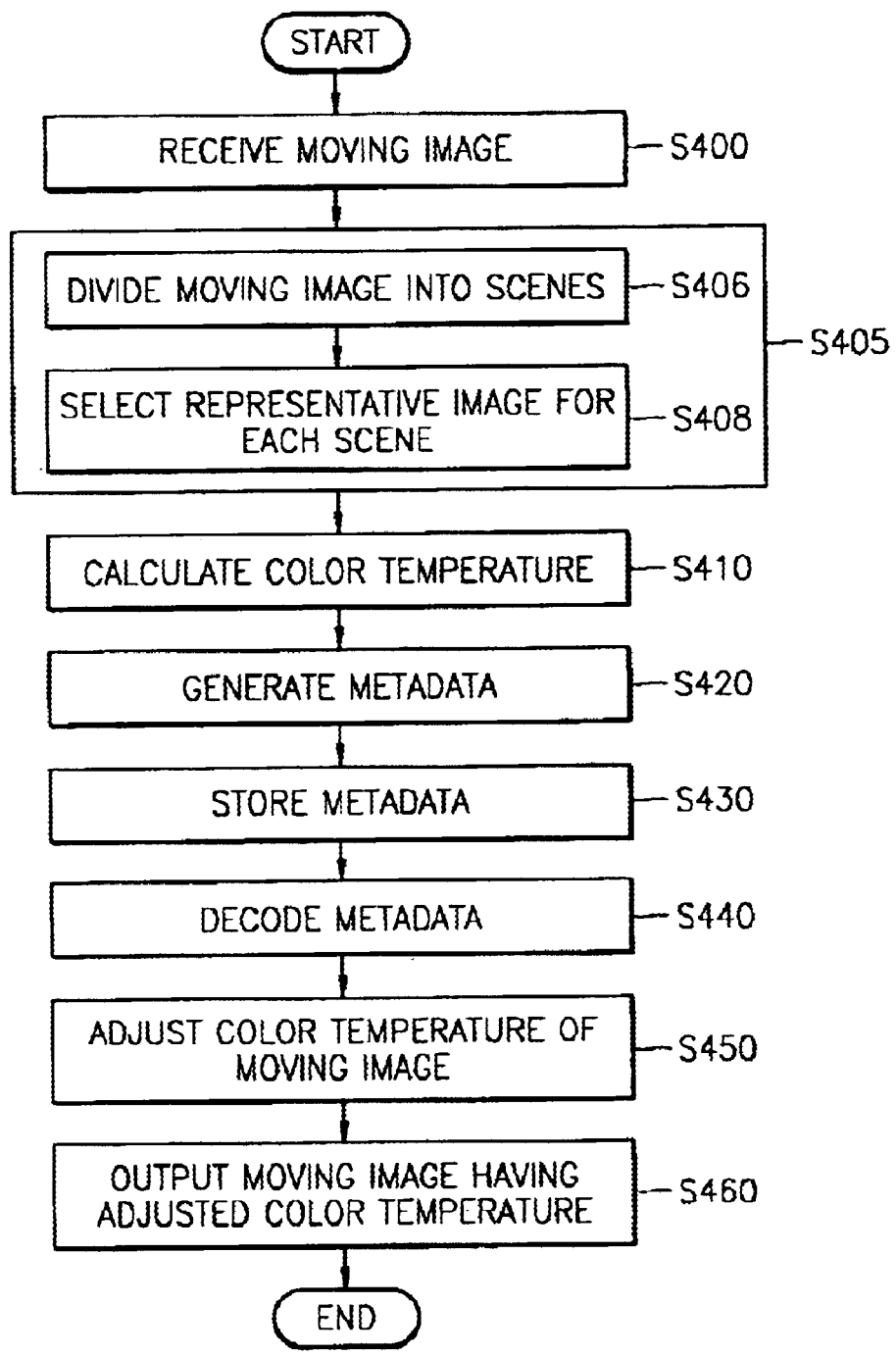
FIG. 4 is a flowchart of a method for adjusting the color temperature of a moving image using color temperature metadata according to another preferred embodiment of the present invention.

FIG. 4 is a flowchart of a method for adjusting the color temperature of a moving image using color temperature metadata according to a second embodiment of the present invention. Referring to FIG. 4, a moving image to be displayed at the user terminal is input into the input unit 300 of the server and then output to the scene-representing image selection unit 305 in step S400.

The scene-representing image selection unit 305 divides the input moving image into scenes and selects a representative image for each of the scenes in step S405. More specifically, in step S405, the scene-representing image selection unit 305 groups frames of the input moving image by scene. In order to group such frames of the input moving image by scene, it must be determined in step S406 whether or not each frame belongs to the same scene. Many methods for determining whether or not a series of frame images constitute the same scene are now available to those skilled in the art. For example, whether or not a series of frame images constitute the same scene can be determined by obtaining a color histogram for each frame image and calculating a difference between color histograms of adjacent frame images, taking advantage of edge characteristics of each frame image, or using motion vector. These methods have already been disclosed to the public, and thus their description will not be presented here.

In step S408, the scene-representing image selection unit 305 divides the moving image input from the input unit 300 into a single frame or a plurality of temporally consecutive frames that are considered as constituting the same scene, selects one frame image as a representative image for each scene, and outputs the representative image for each scene to the color temperature calculation unit 310. A first frame among frames constituting each scene or every several frames of each scene can be selected as a representative image or representative images. However, such representative image(s) can be obtained in various manners other than the one set forth herein.

Like in the first embodiment of the present invention, the color temperature calculation unit 310 calculates the color temperature of the representative image for each scene in step S410 by converting the representative image for each scene into a CIE XYZ color space, approximating the chromaticity coordinates (x, y) of a light source, converting the chromaticity coordinates (x, y) into a correlated color temperature.

The metadata generation unit 320 generates metadata using the color temperature of the representative image for each scene input from the color temperature calculation unit 310 in step S420. Thereafter, the color temperature of each representative image the metadata generation unit 320 is stored in the metadata database 330 with a descriptor representing frame images of each scene in step S430.

When the server receives a request for the input moving image issued by the user terminal, the input moving image is output to the color temperature conversion unit 360 via the input unit 300, and the metadata representing the color temperature of each representative image for each scene of the input moving image stored in the metadata database 330 is output to the metadata decoding unit 350.

The metadata decoding unit 350 decodes the metadata input from the metadata database 330 in the same decoding manner as the one adopted in the first embodiment of the present invention and outputs the decoded metadata to the color temperature conversion unit 360 in step S440. The color temperature conversion unit 360 adjusts the color temperature of the input moving image using the decoded metadata or a color temperature preferred by the user, which has been set in advance or input from the outside, and outputs the result of the adjustment to the display unit 370 in step S450. The display unit 370 outputs the moving image having an adjusted color temperature to the user in step S460.

In the second embodiment of the present invention, however, the scene-representing image selection unit 305 and the color temperature calculation unit 310 can be integrated into one unit. Then, the integrated unit divides a moving image into scenes and obtains color temperatures of all or some of the frames constituting each of the scenes. Thereafter, the integrated unit estimates or calculates a statistical representative value of the color temperatures of all or some of the frames constituting each of the scenes, for example, an average thereof, and determines the estimated or calculated value as a representative color temperature for each of the scenes, thus generating metadata.

The above-mentioned embodiments of the present invention can be written as programs that can be executed in a computer and can be realized in a commonly-used digital computer which operates such programs using a computer-readable recording medium. The computer-readable recording medium includes a magnetic storage, such as a ROM, a floppy disk, or a hard disk, an optically readable medium, such as a CD-ROM or a DVD, and a carrier wave, such as data transmission through the Internet.

According to the present invention, it is possible for a content provider to perform a process of calculating a color temperature, which conventionally requires a considerable amount of computations, during preparing content. In addition, it is also possible to transmit a small amount of metadata with content, i.e., image data. Moreover, a content client does not need to additionally calculate a color temperature, thus reducing the cost of manufacturing a display for the content client. Accordingly, a user can modify images using a portable terminal, even though the portable terminal is generally less effective than a TV set or a personal computer in terms of computability. In addition, according to the present invention, it is possible to re-use the color temperatures of images, which have already been obtained and used to generate metadata, by storing them in a metadata database. Accordingly, the present invention is capable of providing a more effective system for providing images.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for providing image metadata, comprising:
   a color temperature calculation unit which receives a predetermined image and calculates the color temperature of the predetermined image;
   a metadata generation unit which divides a color temperature range into a plurality of color temperature sections and generates metadata using information on a color temperature section to which the color temperature of the predetermined image belongs; and
   a metadata database which stores the metadata corresponding to the predetermined image and transmits the metadata to a user terminal.

2. The apparatus of claim 1 further comprising a representative image selection unit which receives a predetermined moving image signal, divides the predetermined moving image signal into scenes, and selects a representative image for each of the scenes,
   wherein the representative image is the predetermined image and is input into the color temperature calculation unit.

3. The apparatus of claim 2, wherein the metadata database stores metadata corresponding to the predetermined representative image and a descriptor indicating frame images belonging to the same scene as the predetermined representative image.

4. The apparatus of claim 1, wherein the metadata generation unit divides the color temperature range into a first predetermined number of color temperature sections, converts each of the first predetermined number of color temperature sections into a reciprocal color temperature section, divides the reciprocal color temperature section into a second predetermined number of reciprocal color temperature sub-sections, and determines a color temperature section to which the color temperature of the predetermined image belongs.

5. The apparatus of claim 4, wherein the metadata generation unit divides the color temperature range into four color temperature sections based upon how people feel about the images temperature-wise and records the color temperature section to which the color temperature of the predetermined image belongs using 2 bits of the metadata.

6. The apparatus of claim 4, wherein the metadata generator converts each of the first predetermined number of color temperature sections into a reciprocal color temperature section on a megakelvin unit.

7. The apparatus of claim 4, wherein the metadata generation unit divides each of the reciprocal color temperature sections into 64 reciprocal color temperature sub-sections and records a reciprocal color temperature sub-section to which the color temperature of the predetermined image belongs using 6 bits of the metadata.

8. The apparatus of claim 1, wherein the metadata database stores the generated metadata together with its corresponding image.

9. A method for providing image metadata, comprising:
calculating the color temperature of a predetermined input image;
dividing a color temperature range into a plurality of color temperature sections and generating metadata using information on a color temperature section to which the color temperature of the input image belongs; and
storing the metadata and transmitting the input image and its corresponding metadata to a user terminal.

10. The method of claim 9 further comprising, prior to said calculating step, dividing a predetermined input moving image into scenes and selecting a representative image for each of the scenes,
wherein in said calculating step, the color temperature of the representative image is calculated.

11. The method of claim 10, wherein in said storing step, metadata corresponding to the representative image and a descriptor indicating frame images belonging to the same scene as the representative image are stored.

12. The method of claim 9, wherein in said dividing step, the color temperature range is divided into a first predetermined number of color temperature sections, each of the first predetermined number of color temperature sections is converted into a reciprocal color temperature section, the reciprocal color temperature section is divided into a second predetermined number of reciprocal color temperature sub-sections, and a color temperature section to which the color temperature of the predetermined image belongs is determined.

13. The method of claim 12, wherein in said dividing step, the color temperature range is divided into four color temperature sections based upon how people feel about the images temperature-wise and the color temperature section to which the color temperature of the predetermined image belongs is recorded using 2 bits of the metadata.

14. The method of claim 12, wherein in said dividing step, each of the first predetermined number of color temperature sections is converted into a reciprocal color temperature section on a megakelvin unit.

15. The method of claim 12, wherein each of the reciprocal color temperature sections is divided into 64 reciprocal color temperature sub-sections and a reciprocal color temperature sub-section to which the color temperature of the predetermined image belongs is recorded using 6 bits of the metadata.

16. The method of claim 9, wherein in said storing step, metadata and its corresponding image are stored together.

17. An apparatus for adjusting the color temperature of an image, comprising:
a metadata decoding unit which receives metadata containing information on the color temperature of the image, identifies a color temperature section to which the color temperature of the image belongs, converts the color temperature section into a reciprocal color temperature section, identifies a reciprocal color temperature sub-section to which the color temperature of the image belongs, and then determines a color temperature of an image to be output;
a color temperature conversion unit which receives the image and adjusts the color temperature of the image based upon the determined color temperature and a preferred color temperature input from a user; and
an output unit which outputs the image having the adjusted color temperature to the user.

18. The apparatus of claim 17, wherein the metadata decoding unit identifies the color temperature section to which the color temperature of the image belongs by decoding first two bits of the color temperature data of the image included in the metadata.

19. The apparatus of claim 17, wherein the color temperature range that has been set in advance is converted into a reciprocal color temperature section on a megakelvin unit.

20. The apparatus of claim 17, wherein the color temperature data is composed of 8 bits and the metadata decoding unit identifies the reciprocal color temperature sub-section to which the color temperature of the image belongs by decoding the remaining 6 bits of the color temperature data of the image included in the metadata and then determines the color temperature of the image to be output.

21. The apparatus of claim 20, wherein the metadata decoding unit determines the color temperature of the image to be output by converting an average of a maximum and a minimum of the reciprocal color temperature sub-section to which the color temperature of the image belongs into a color temperature section.

22. The apparatus of claim 17, wherein in a case where the image to be output is a moving image and the color temperature metadata is generated for a representative image of a scene of the moving image, the color temperature of each frame image belonging to the same scene as the representative image is adjusted based upon the color temperature metadata for the representative image.

23. A method for adjusting the color temperature of an image, comprising:
(a) receiving metadata containing information on the color temperature of the image and identifying a color temperature section to which the color temperature of the image belongs;
(b) converting the color temperature section into a reciprocal color temperature section, identifying a reciprocal color temperature sub-section to which the color temperature of the image belongs, and then determining a color temperature of an image to be output;
(c) receiving the image and adjusting the color temperature of the image based upon the determined color temperature and a preferred color temperature input from a user; and
(d) outputting the image having the adjusted color temperature to the user.

24. The method of claim 23, wherein in step (a), the color temperature section to which the color temperature of the image belongs is identified by decoding first two bits of the color temperature data of the image included in the metadata.

25. The method of claim 23, wherein in step (b), the color temperature range that has been set in advance is converted into a reciprocal color temperature section on a megakelvin unit.

26. The method of claim 23, wherein in step (b), the color temperature data is composed of 8 bits and the reciprocal color temperature sub-section to which the color temperature of the image belongs is identified by decoding the remaining 6 bits of the color temperature data of the image included in the metadata and then determines the color temperature of the image to be output.

27. The method of claim 26, wherein in step (b), the color temperature of the image to be output is determined by converting an average of a maximum and a minimum of the reciprocal color temperature sub-section to which the color temperature of the image belongs into a color temperature section.

28. The method of claim 23, wherein in a case where the image to be output is a moving image and the color temperature metadata is generated for a representative image of a scene of the moving image, the color temperature of each frame image belonging to the same scene as the representative image is adjusted based upon the color temperature metadata for the representative image.

29. A system for adjusting the color temperature of an image using metadata, comprising:
- a color temperature calculation unit which receives a predetermined image and calculates the color temperature of the image;
- a metadata generation unit which divides a color temperature range into a plurality of color temperature sections and generates metadata using information on a color temperature section to which the color temperature of the predetermined image belongs;
- a metadata database which stores the metadata corresponding to the predetermined image and transmits the metadata to a user terminal;
- a metadata decoding unit which receives metadata containing information on the color temperature of the image, identifies a color temperature section to which the color temperature of the image belongs, converts the color temperature section into a reciprocal color temperature section, identifies a reciprocal color temperature sub-section to which the color temperature of the image belongs, and then determines a color temperature of an image to be output;
- a color temperature conversion unit which receives the predetermined image and adjusts the color temperature of the image based upon the determined color temperature and a preferred color temperature input from a user; and
- an output unit which outputs the image having the adjusted color temperature to the user.

30. A method for adjusting the color temperature of an image using metadata, comprising:
- (a1) calculating the color temperature of a predetermined input image;
- (a2) dividing a color temperature range into a plurality of color temperature sections and generating metadata using information on a color temperature section to which the color temperature of the input image belongs;
- (a3) storing the metadata and transmitting the input image and its corresponding metadata to a user terminal;
- (b1) receiving metadata containing information on the color temperature of the image and identifying a color temperature section to which the color temperature of the image belongs;
- (b2) converting the color temperature section into a reciprocal color temperature section, identifying a reciprocal color temperature sub-section to which the color temperature of the image belongs, and then determining a color temperature of an image to be output;
- (b3) receiving the image and adjusting the color temperature of the image based upon the determined color temperature and a preferred color temperature input from a user; and
- (b4) outputting the image having the adjusted color temperature to the user.

31. A computer-readable recording medium, on which a program enabling the method of claim 9 is recorded.

32. A computer-readable recording medium, on which a program enabling the method of claim 23 is recorded.

33. A computer-readable recording medium, on which a program enabling the method of claim 30 is recorded.

* * * * *